(12) United States Patent
Yamazaki

(10) Patent No.: US 8,315,030 B2
(45) Date of Patent: Nov. 20, 2012

(54) MEMS DEVICE AND METHOD OF MANUFACTURING THE SAME

(75) Inventor: Hiroaki Yamazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 277 days.

(21) Appl. No.: 12/724,998

(22) Filed: Mar. 16, 2010

(65) Prior Publication Data

US 2010/0328840 A1 Dec. 30, 2010

(30) Foreign Application Priority Data

Jun. 25, 2009 (JP) ................. 2009-151246

(51) Int. Cl.
*H01Q 7/00* (2006.01)
(52) U.S. Cl. ........ 361/261; 361/273; 361/278; 361/279; 361/283.3; 361/290
(58) Field of Classification Search .................. 361/281, 361/272–273, 277–279, 290–292, 283.3, 361/283.1
See application file for complete search history.

(56) References Cited

U.S. PATENT DOCUMENTS

| 6,115,231 | A | * | 9/2000 | Shirakawa | .................... 361/233 |
| 7,242,273 | B2 | * | 7/2007 | Isobe et al. | ....................... 335/78 |
| 2007/0181411 | A1 | | 8/2007 | Ikehashi et al. | |
| 2008/0265710 | A1 | | 10/2008 | Ikehashi et al. | |

FOREIGN PATENT DOCUMENTS

JP 2008-278634 11/2008

* cited by examiner

*Primary Examiner* — Nguyen T Ha

(74) *Attorney, Agent, or Firm* — Turocy & Watson, LLP

(57) ABSTRACT

A MEMS device of an aspect of the present invention including a MEMS element includes a first lower electrode provided on a substrate, a first insulator which is provided on the upper surface of the first lower electrode, and has a first thickness, and a movable first upper electrode supported by an anchor in midair above the first lower electrode, and a capacitance element includes a second lower electrode provided on the substrate, a second insulator which is provided on the upper surface of the second lower electrode, and has a second thickness, and a second upper electrode provided on the second insulator, wherein the second thickness is less than the first thickness.

12 Claims, 11 Drawing Sheets

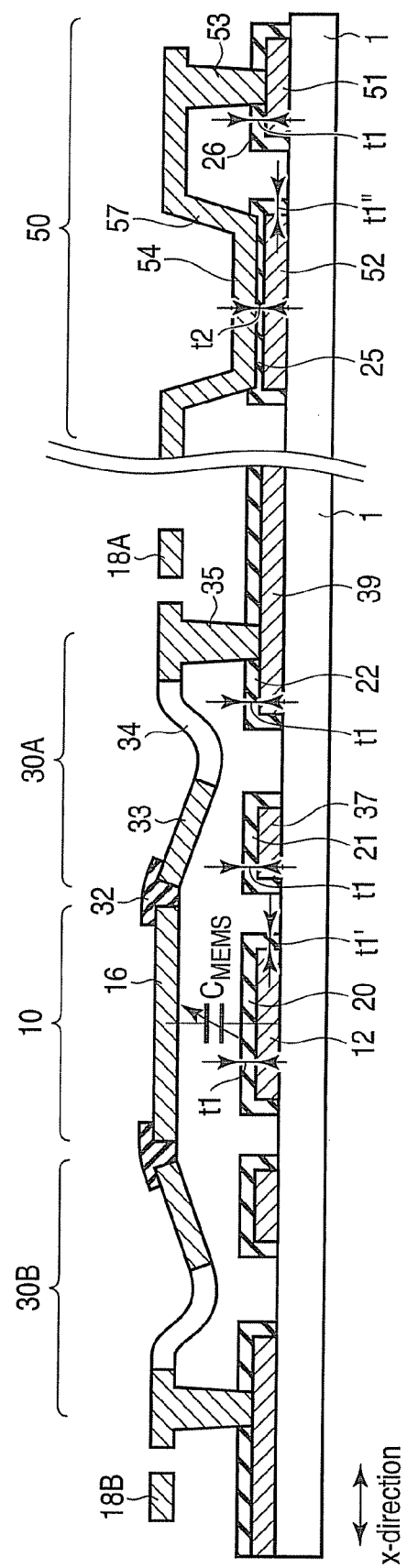
F I G. 2

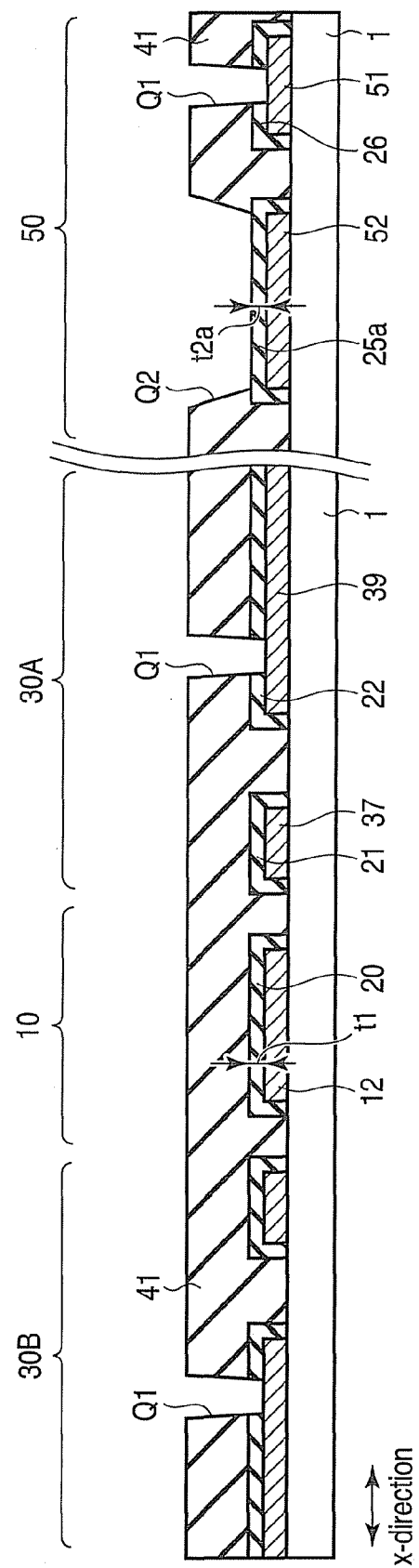
F I G. 3B

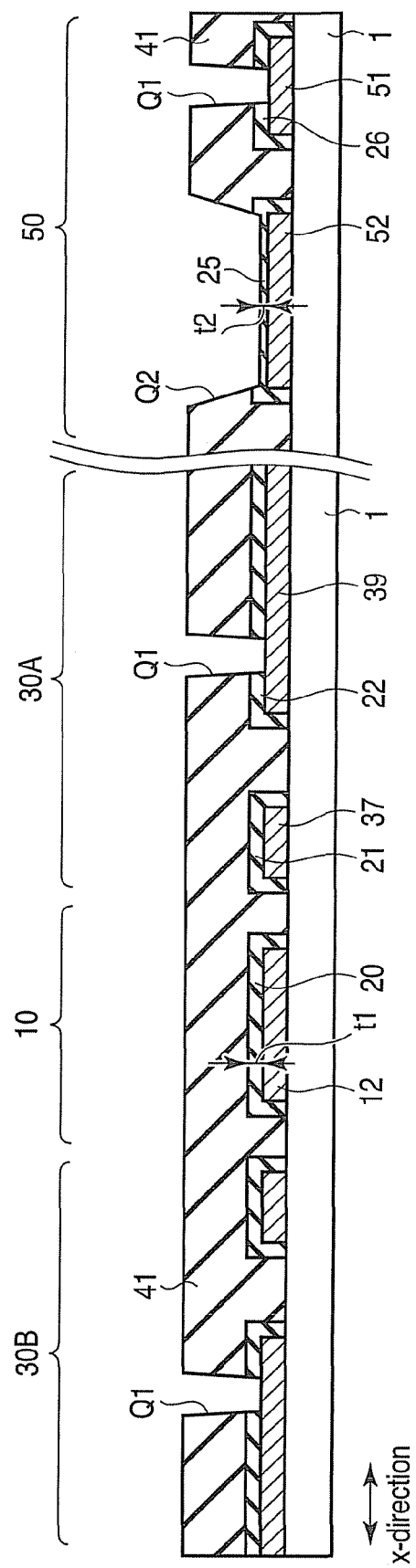
F I G. 3C

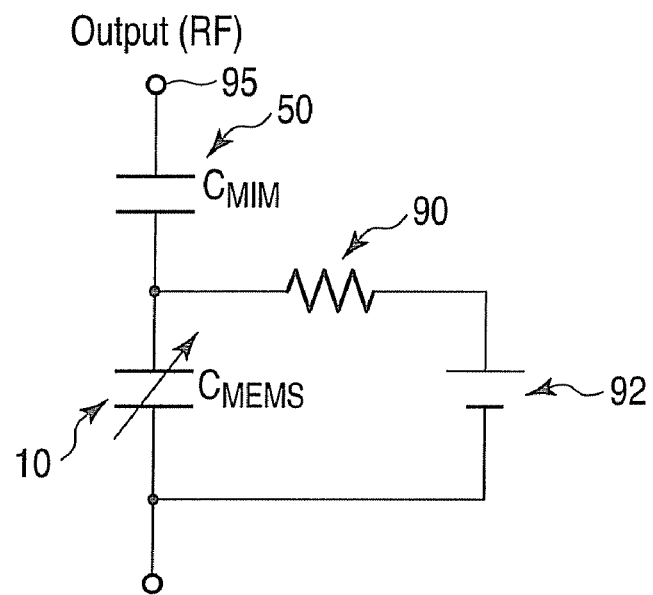
F I G. 8A
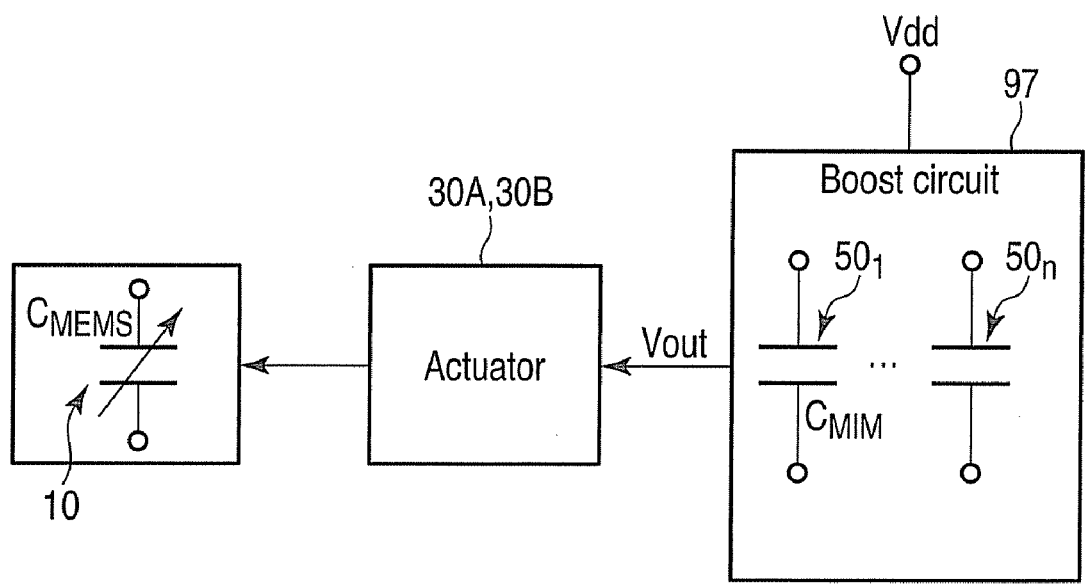
F I G. 8B

MEMS DEVICE AND METHOD OF MANUFACTURING THE SAME

CROSS-REFERENCE TO RELATED APPLICATIONS

This application is based upon and claims the benefit of priority from prior Japanese Patent Application No. 2009-151246, filed Jun. 25, 2009, the entire contents of which are incorporated herein by reference.

BACKGROUND

A MEMS device using micro-electromechanical systems (MEMS), for example, a radio-frequency (RF) circuit using a MEMS variable capacitance element, is expected to be used in next generation radio systems because of the reduced output signal loss of the MEMS variable capacitance element and excellent output signal linearity (JP 2008-278634).

A MEMS variable capacitance element is produced in a backend process, and is formed in an interconnect level higher than a semiconductor integrated circuit formed on a semiconductor substrate. Passive elements such as an inductor and a capacitance element having a metal-insulator-metal (MIM) structure are formed simultaneously in the same interconnect level as is a MEMS variable capacitance element.

A MIM capacitance element is formed to have a large capacitance corresponding to required characteristics. Therefore, a MIM capacitance element is required to incorporate an insulator having a high dielectric constant, and/or an insulator having a small thickness in the insulator interposed between opposing electrodes (metals).

In contrast, a MEMS variable capacitance element is influenced by the surface roughness of a component electrode or insulator, and the influence of the thickness and dielectric constant of the insulator on the capacitance is not as large in a MEMS variable capacitance element as in a MIM capacitance element. However, considering the reliability of an insulator constituting a MEMS variable capacitance element, the thickness of an insulator used in a MEMS variable capacitance element is desirably as thick as possible in a range of realizing a desired capacitance, in order to reduce an electric field produced between opposing electrodes.

As described above, different characteristics are required for an insulator constituting a MEMS variable capacitance element, and an insulator constituting a MIM capacitance element.

However, as described above, a MEMS variable capacitance element and MIM capacitance element are formed simultaneously in the same manufacturing process, and it is difficult to construct the insulators constituting the these elements given the required characteristics.

SUMMARY

A MEMS device of an aspect of the present invention comprising: a MEMS element comprising a first lower electrode provided on a substrate; a first insulator which is provided on the upper surface of the first lower electrode, and has a first thickness; and a movable first upper electrode supported by an anchor in midair above the first lower electrode; and a capacitance element comprising a second lower electrode provided on the substrate; a second insulator which is provided on the upper surface of the second lower electrode, and has a second thickness; and a second upper electrode provided on the second insulator, wherein the second thickness is less than the first thickness.

A method of manufacturing a MEMS device an aspect of the present invention comprising: forming a first lower electrode of a MEMS element, and a second lower electrode of a capacitance element on a substrate; forming a first insulator having a first thickness on the first and second lower electrodes; forming a sacrificial layer on the first insulator; forming a first opening in a sacrificial layer in an area forming an anchor, and forming a second opening in the sacrificial layer simultaneously with forming the first opening so that the first insulator on the second lower electrode is exposed; forming a second insulator having a second thickness less than the first thickness on the second lower electrode, by etching the exposed first insulator through the second opening; forming a conductive layer on the sacrificial layer and on the second insulator; and removing the sacrificial layer, after processing the conductive layer, and forming a first upper electrode of the movable MEMS element supported by an anchor in midair above the first lower electrode, and a second upper electrode of the capacitance element on the second insulating film.

A method of manufacturing a MEMS device an aspect of the present invention comprising: forming a first lower electrode of a MEMS element, and a second lower electrode of a capacitance element on a substrate; forming a first insulator having a first dielectric constant on the first and second lower electrodes; removing the first insulator on the second lower electrode; forming a second insulator having a second dielectric constant higher than that of the first dielectric constant on the second lower electrode; forming a sacrificial layer on the first and second insulators; forming a first opening in a sacrificial layer in an area forming an anchor, and forming a second opening in the sacrificial layer simultaneously with forming the first opening so that the second insulator on the second lower electrode is exposed; forming a conductive layer on the sacrificial layer and second insulator; and removing the sacrificial layer, after processing the conductive layer, and forming a first upper electrode of a movable MEMS element supported by an anchor in midair above the first lower electrode, and a second upper electrode of a capacitance element on the second insulating film.

BRIEF DESCRIPTION OF THE DRAWING

FIG. 2 is a sectional view showing a structure of a MEMS device according to a first embodiment;

FIGS. 3A-3D are views for explaining a method of manufacturing a MEMS device according to a first embodiment;

FIGS. 8A and 8B show application examples of a MEMS device according to each embodiment.

DETAILED DESCRIPTION

Embodiments of the invention will be explained in detail hereinafter with reference to the accompanying drawings.

Embodiments (1) First Embodiment

A first embodiment of the invention will be explained with reference to FIGS. 1 to 3D.

(a) Structure

Figure 1:
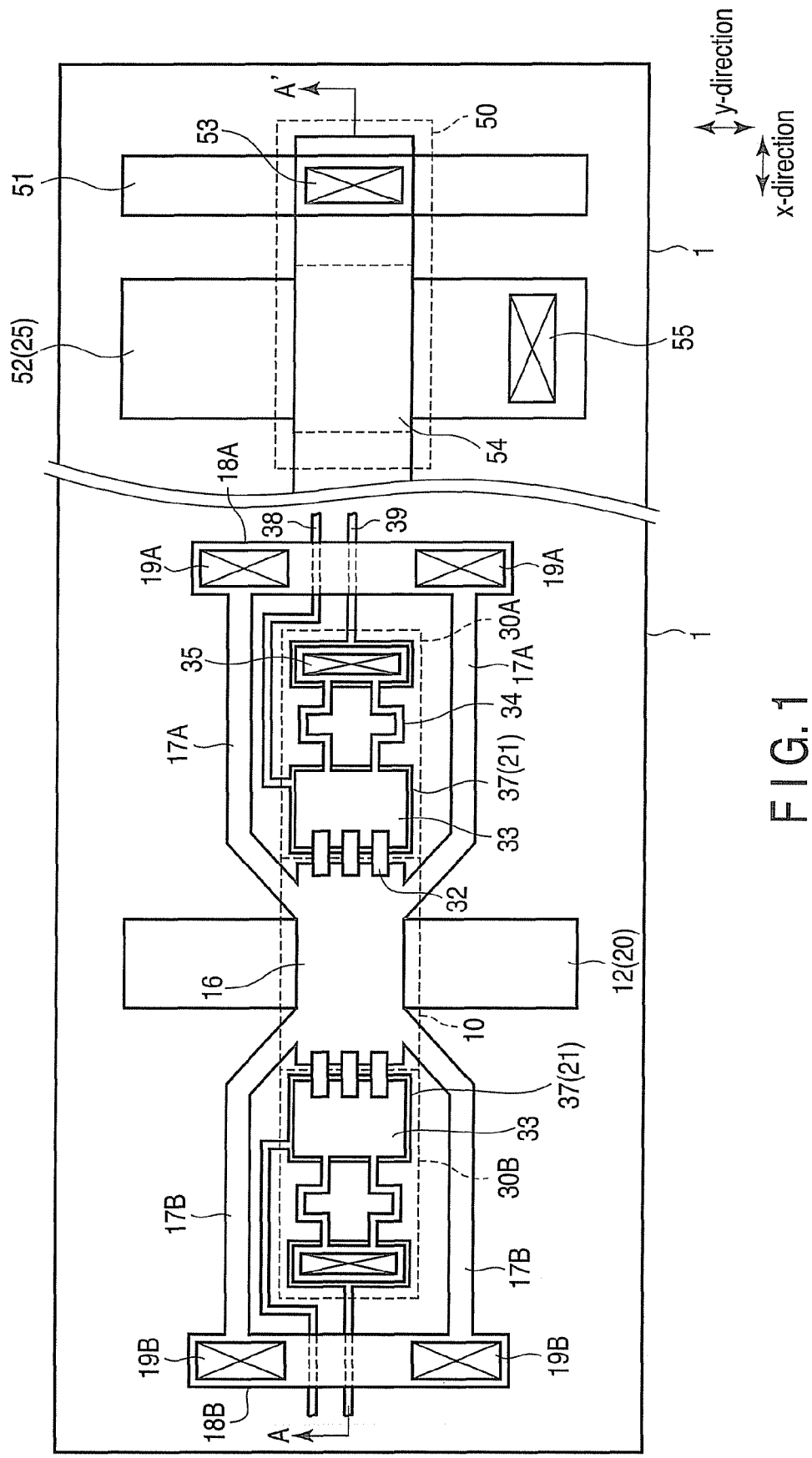
FIG. 1 is a plan view showing a structure of a MEMS device according to a first embodiment.

An explanation will be given of the structure of a MEMS device according to a first embodiment of the invention with reference to FIGS. 1 and 2. FIG. 1 is a plan view of the structure of the MEMS device according to the first embodiment. FIG. 2 is a sectional view of the structure of the MEMS device according to the first embodiment. FIG. 2 is a cross section taken along line A-A' of FIG. 1. In this embodiment, a MEMS device using a MEMS variable capacitance element is explained. The MEMS device in this embodiment comprises a movable structure 10 constituting a variable capacitance element, actuators 30A and 30B for driving the movable structure 10, and a peripheral circuit for controlling the operations of the movable structure 10 and actuators 30A and 30B.

As shown in FIGS. 1 and 2, the MEMS device according to this embodiment is provided on a substrate 1. The substrate 1 is an insulating substrate of glass, or an interlayer insulating film provided on a silicon substrate, for example. A metal-insulator-semiconductor (MIS) field-effect transistor is provided on the surface (semiconductor area) of a silicon substrate, for example, and an element such as a transistor constituting a logic circuit or a storage circuit.

The movable structure 10 comprises a lower signal electrode (first lower electrode) 12, and an upper signal electrode (first upper electrode) 16.

The lower signal electrode 12 is provided on the substrate 1, extending in the y-direction. The lower signal electrode 12 is fixed on the substrate 1. The lower signal electrode 12 functions as an electrode of a capacitance element, and functions also as a signal line, for example. The lower signal electrode 12 is made of a metal such as aluminum (Al), copper (Cu), platinum (Pt) or gold (Au), or an alloy of these metals. The lower signal electrode 12 may be a conductive semiconductor.

The surface of the lower signal electrode 12 is covered by an insulator 20. Insulator 20 has a first thickness t1. Insulator 20 may be formed by oxidizing or nitriding the surface of electrode 12, or may be formed on the surface of electrode 12 by a film deposition technique.

An upper signal electrode 16 is provided above the lower signal electrode 12. Like the lower signal electrode 12, the upper signal electrode 16 is made of a metal such as aluminum (Al), copper (Cu), platinum (pt) or gold (Au). The upper signal electrode 16 has a rectangular plane, and extends in the x-direction. The upper signal electrode 16 is supported in midair by beams 17A and 17B, and anchors 19A and 19B. Therefore, a cavity is provided between the lower signal electrode 12 and upper signal electrode 16.

As described above, the upper surface of the lower signal electrode 12 opposes the bottom surface of the upper signal electrode 16 through insulator 20 and the cavity. Capacitance $C_{MEMS}$ is produced between the lower signal electrode 12 and upper signal electrode 16. The upper signal electrode 16 moves up and down with respect to the surface of the substrate 1 according to the movements of actuators 30A and 30B described later. Thereby, the capacitance $C_{MEMS}$ between the signal electrodes 12 and 16 is changed. Hereinafter, the movable structure 10 is called a MEMS variable capacitance element 10.

The signal electrodes 12 and 16 are not limited to a rectangular plane shape, and may be circular or oval including a curve. The signal electrodes 12 and 16 may each have a hole penetrating from the upper surface to bottom surface. A part of the substrate 1 below the lower signal electrode 12 may be removed by a technique using a sacrificial layer, and a cavity may be provided below the lower signal electrode 12.

Anchors 19A and 19B are provided on the substrate 1, or on an interconnect (conductive layer) on the substrate 1, for example.

Beams 17A and 17B are extended in the X-direction. One end of beam 17A and 17B is directly connected to an end portion of the upper signal electrode 16. For example, two right-side beams 17A in FIG. 1 are drawn out from one end of the upper signal electrode 16 much as if being divided into two parts. The other end of beam 17A is connected to anchor 19A through conductive layer 18A. One end of two left-side beams 17B in FIG. 1 is drawn out from an end portion of the upper signal electrode 16 much as if being divided into two parts. The other end of beam 17B is connected to anchor 19B through a conductive layer 18B.

Beams 17A and 17B are supported in midair by anchors 19A and 19B, and a cavity is provided between the substrate 1 and beams 17A and 17B.

In this embodiment, beams 17A and 17B are directly connected to the upper signal electrode 16. Beams 17A and 17B may be connected to the upper signal electrode 16 through other members. For example, beams 17A and 17B and anchors 18A and 18B are of the same material as that of the upper signal electrode 16.

On both sides of the X-direction of the MEMS variable capacitance element (movable structure) 10, bridge structure actuators 30A and 30B are provided. In FIG. 1, the right-side actuator 30A is placed between two beams 17A, and the left-side actuator 30B is placed between two beams 17B.

In FIGS. 1 and 2, the right-side actuator 30A comprises an upper drive electrode 33, and a lower drive electrode 37. The left-side actuator 30B comprises an upper drive electrode 33, and a lower drive electrode 37, similar to the right-side actuator 30A. The actuators 30A and 30B have substantially the same structure, and the structures of actuators 30A and 30B will be explained hereinafter with reference only to the right-side actuator 30A.

The lower drive electrode 37 is provided and fixed to the substrate 1. The lower drive electrode 37 has a rectangular plane, for example. The lower drive electrode 37 is connected to an interconnect 38, for example. The lower drive electrode 37 is of the same material as that of the lower signal electrode 12.

The surface of the lower drive electrode 37 is covered by an insulator 21, for example. Insulator 21 is of the same material as that of insulator 20 covering the surface of the lower signal electrode 12, for example. The thickness of insulator 21 is the same as thickness t1 of insulator 20 covering the lower signal electrode 12, for example.

The upper drive electrode 33 is provided above the lower drive electrode 37. The upper drive electrode 33 has a rectangular plane. In two actuators 30A and 30B, an insulating layer (joint) 32 is provided at one end of the upper drive electrode 33. Through the joint 32, the upper drive electrode 33 of each actuator 30A and 30B is connected to one end and the other end of the upper signal electrode 16 of the movable structure 10. The joint 32 is made of an insulating material such as silicon nitride, and the upper drive electrode 33 is electrically insulated from the upper signal electrode 16. If the signal electrode 16 may be electrically connected to the drive electrode 33, the joint 32 may be made of a conductive material instead of an insulating material, or a joint need not be used, and the upper signal electrode 16 and upper drive electrode 33 may be constructed as a single conductive layer.

A spring structure 34 is connected to the other end of the upper drive electrode 33. The spring structure 34 has a meandering plane, for example. The interconnect constituting the spring structure 34 is thinner than the interconnect constituting beams 17A and 17B, for example. The spring structure 34 is connected to an anchor 35. Anchor 35 is provided on interconnect (conductive layer) 39 on the substrate 1, for example. The surface of interconnect 39 is covered by an insulator 22. The thickness of insulator 22 is t1, which is the same thickness as that of insulator 20 covering the lower signal electrode 12, for example. Anchor 35 is electrically connected to interconnect 39 through an opening formed in insulator 22. The spring structure 34 and anchor 35 are of the same conductive material as that of the upper signal electrode 16, for example.

The upper drive electrode 33 is supported in midair by the spring structure 34 and anchor 35. A cavity is provided between the upper drive electrode 33 and lower drive electrode 37. As the elasticity of the spring structure 34 of the upper drive electrode 33 is different from that of the upper signal electrode 16, the spring structure 34 sags down from the upper signal electrode 16 (to the lower drive electrode 37).

When the MEMS variable capacitance element 10 is driven, electric potential is applied to the upper drive electrode 33 through anchor 36 and spring structure 34 provided on interconnect 39. Electric potential is applied to the lower drive electrode 37 through interconnect 38. Thereby, a potential difference is produced between the upper drive electrode 33 and lower drive electrode 37.

In this embodiment, the actuators 30A and 30B are electrostatic drive actuators. In other words, if a potential difference is produced between the upper drive electrode 33 and lower drive electrode 37 in the actuators 30A and 30B, the upper drive electrode 33 is moved in a vertical direction with respect to the surface of the substrate 1 by the electrostatic attractive force produced between the drive electrodes 33 and 37. As the upper drive electrode 33 is moved, the movable upper signal electrode 16 of the MEMS variable capacitance element (movable structure) 10 is moved.

FIG. 2 shows the states of the MEMS variable capacitance element 10 and actuators 30A and 30B before driving. For example, ground potential is applied to one drive electrode, and potential higher than a pull-in voltage is applied to the other drive electrode. A pull-in voltage means a voltage at which the upper drive electrode 33 connected to the spring structure 34 is moved by an electrostatic attractive force.

When a potential difference higher than a pull-in voltage is applied across the drive electrodes, an electrostatic force enough to move the upper drive electrode 33 is produced between the upper drive electrode 33 and lower drive electrode 37. The electrostatic force produced between the upper drive electrode 33 and lower drive electrode 37 of the actuators 30A and 30B is strong when the interval between the drive electrodes 33 and 37 is small. Therefore, the upper drive electrode 33 contacts gradually from the spring structure 34 side of the drive electrode 33 to the lower drive electrode 37 through insulating film 36. In the period while a potential difference is being produced between the drive electrodes 33 and 37, the interval between the drive electrodes 33 and 37 is gradually reduced in the direction from the spring structure 34 to the movable structure 10, and the upper drive electrode 33 sequentially contacts the lower drive electrode 37 like a zipper. The upper drive electrode 33 contacts the lower drive electrodes 37 in substantially the whole area through insulating film 38.

The actuators 30A and 30B are driven as described above, and the MEMS variable capacitance element 10 is moved along the movements of the actuators 30A and 30B. When the actuators 30A and 30B are moved, the upper signal electrode 16 connected to the upper drive electrode 33 is moved to the lower signal electrode 12, and the interval between the upper signal electrode 16 and lower signal electrode 12 is reduced. For example, when the upper signal electrode 16 contacts the lower signal electrode (signal line) 12 through insulator 20, the interval between the signal electrodes 12 and 16 becomes equal to the thickness of insulator 20.

When the potential difference between the drive electrodes 33 and 37 of the actuators 30A and 30B is zero, the interval between the upper signal electrode 16 and lower signal electrode 12 is increased, and the MEMS variable capacitance element 10 returns to the original state (FIG. 2).

As described above, the interval between the lower signal electrode 12 and upper signal electrode 16, constituting the MEMS variable capacitance element 10, is changed according to the movements of the actuators 30A and 30B. Therefore, the capacitance produced between the lower signal electrode 12 and upper signal electrode 16 is changed according to the changes in the interval between the signal electrodes 12 and 16. As capacitance is inversely proportional to the interval between two opposing electrodes, the capacitance $C_{MEMS}$ is decreased when the interval between the lower signal electrode 12 and upper signal electrode 16 is increased, and increased when the interval is decreased. When the MEMS variable capacitance element 10 is driven, the interval between the signal electrodes 12 and 16 may be changed, and the upper signal electrode 16 may not directly contact insulator 20.

As described above, the capacitance $C_{MEMS}$ of the MEMS variable capacitance element 10 is produced between the lower signal electrode 12 and upper signal electrode 16. The upper signal electrode 16 is driven by the actuators 30A and 30B in the direction vertical to the upper surface of the substrate 1. Thereby, the interval between the upper signal electrode 16 and lower signal electrode 12 is changed, and the capacitance $C_{MEMS}$ of the MEMS variable capacitance element 10 is changed.

A metal-insulator-metal (MIM) element 50 is provided on the substrate 1. The MIM element 50 is a capacitance element, for example. Hereinafter, the MIM element 50 is called a MIM capacitance element 50. The MIM capacitance element 50 is provided in the same interconnect level as are the MEMS variable capacitance element 10 and actuators 30A and 30B. The MIM capacitance element 50 is formed on the substrate 1 in the same manufacturing process as are the MEMS variable capacitance element 10 and actuators 30A and 30B.

The MIM capacitance element 50 comprises two electrodes 52 and 54, and an insulator 25 interposed between electrodes 52 and 54.

The lower electrode (second lower electrode) 52 of the MIM capacitance element 50 is provided and fixed on the substrate 1. The lower electrode 52 is of the same material as that of the lower signal electrode 12.

Insulator (second insulator) 25 is provided on the lower electrode 52. Insulator 25 is of the same material as that of insulator 20 of the MEMS variable capacitance element 10.

The upper electrode (second upper electrode) 54 of the MIM capacitance element 50 is provided on insulator 25. The upper electrode 54 is fixed above the lower electrode 52. The upper electrode 54 directly contacts and joins insulator 25. The upper electrode 54 opposes the lower electrode 52 through insulator 25. The upper electrode 54 is of the same material as that of the upper signal electrode 16.

In insulator 25 of the MIM capacitance element 50, a part held between the upper electrode 54 and lower electrode 52 has a second thickness t2. Thickness t2 is less than thickness t1 of insulator 20. A fourth thickness t1" of insulator (fourth insulator) 25 on the side of the lower electrode 52 is substantially equal to a third thickness t1' of insulator (third insulator) 20 covering the side of the lower signal electrode 12 of the MEMS variable capacitance element 10.

Thickness t1" is greater than thickness t2.

The MIM capacitance element 50 is a fixed capacitance element, and has a certain capacitance $C_{MIN}$.

In the MIM capacitance element 50 shown in FIGS. 1 and 2, the lower electrode 52 has a rectangular plane, and extends in the y-direction, for example. A contact 55 is provided at one end of the lower electrode 52. The contact 55 directly contacts the surface of the lower electrode 52, and electrically connected to the lower electrode 52, through an opening formed in insulator 25.

The upper electrode 54 has a rectangular plane, for example. A pullout part 57 is connected to one end and the other end of the upper electrode 54. For example, the pullout part 57 is extended obliquely upward from one end of the upper electrode 54, in the direction vertical to the surface of the substrate 1. A contact 53 is connected to the pullout part 57. The contact 53 directly contacts interconnect 51 on the substrate 1 through an opening formed in an insulator 26. The upper electrode 54 is electrically connected to interconnect 51 fixed to the substrate 1 through the pullout part 57 and contact 53. A voltage or a signal is input to and output from electrodes 52 and 54 of the MIM capacitance element 50. The thickness (fifth thickness) of insulator (fifth insulator) 26 on interconnect 51 is the same as thickness t1 of insulator 20 on the lower signal electrode 12, for example.

In FIGS. 1 and 2, the pullout part 57 is connected to both ends of the upper electrode 54 of the MIM capacitance element 50. A place to connect the pullout part is not limited to this. For example, the pullout part may be connected to only one end of the MIM capacitance element 50. In FIGS. 1 and 2, interconnect 51 is connected to only one end of the upper electrode 54. Interconnect 51 and contact 53 may of course be connected to the pullout parts 57 at both ends of the upper electrode 54. The plan structure of the MIM capacitance element 50 is not limited to the structure shown in FIG. 1.

As shown in FIGS. 1 and 2, the MEMS device according to the first embodiment of the invention comprises a MEMS variable capacitance element 10, and a MIM capacitance element 50. The MEMS variable capacitance element 10 and MIM capacitance element 50 are formed simultaneously.

In this embodiment, the MEMS variable capacitance element 10 comprises a lower signal electrode 12, an insulator 20 on the lower signal electrode 12, and an upper signal electrode 16 above the lower signal electrode 12. The upper signal electrode 16 is supported in midair above the lower signal electrode 12 by beams 17A and 17B and anchors 18A and 18B, for example. A cavity is provided between the lower signal electrode 12 and upper signal electrode 16.

In this embodiment, the MIM capacitance element 50 comprises a lower electrode 52, an upper electrode 54, and an insulator 25 held between the lower electrode 52 and upper electrode 54.

In this embodiment, thickness t2 of insulator 25 constituting the MIM capacitance element 50 is less than thickness t1 of insulator 20 constituting the MEMS variable capacitance element 10.

The capacitance of the capacitance element 50 is proportional to the dielectric constant of insulator 25 interposed between electrodes 52 and 54, and the opposing area of electrodes 52 and 54. The capacitance $C_{MIM}$ of the MIM capacitance element 50 is inversely proportional to the interval between electrodes 52 and 54, or the thickness of insulator 25 interposed between electrodes 52 and 54.

Therefore, in comparison with a case where the thickness of an insulator constituting a MIM capacitance element is the same as that of an insulator constituting a MEMS variable capacitance element, the capacitance of the MIM capacitance element 50 can be increased by reducing thickness t2 of insulator 25 constituting the MIM capacitance element 50 to be less than thickness t1 of insulator 20 constituting the MEMS variable capacitance element 10, as in this embodiment.

In contrast, in this embodiment, thickness t1 of insulator 20 constituting the MEMS variable capacitance element 10 is greater than thickness t2 of insulator 25 constituting the MIM capacitance element 50, and the thickness when the insulators are stacked is ensured. Therefore, in the MEMS variable capacitance element 10, an electric field produced between the opposing lower signal electrode 12 and upper signal electrode 16 can be reduced.

In the process of manufacturing a MEMS device of this embodiment, a sacrificial layer covering insulator 25 of the MIM capacitance element 50 is removed at the time an opening for embedding an anchor and contact is formed in a sacrificial layer. In contrast, insulator 20 of the MEMS variable capacitance element 10 is left in being covered by a sacrificial layer. Insulator 25 of the MIM capacitance element 50 is thinned by etching the surface of the exposed insulator 25. Thereby, thickness t2 of insulator 25 constituting the MIM capacitance element 50 is reduced to be less than thickness t1 of insulator 20 constituting the MEMS variable capacitance element 10. This manufacturing process will be explained in detail later.

In this embodiment, the process of reducing thickness t2 of insulator 25 of the MIM capacitance element 50 is executed in the same process as that in which other members are formed. Therefore, when a MEMS device according to this embodiment is formed, the MEMS variable capacitance element 10 and MIM capacitance element 50 are not formed in different processes. Even if the thickness of insulators 20 and 25 used in the MEMS variable capacitance element 10 and MIM capacitance element 50 is different, it does not excessively increase the number of manufacturing processes and costs of a MEMS device.

As described above, according to the MEMS device according to the first embodiment of the invention, it is possible to improve both of the reliability of MEMS element (MEMS variable capacitance element) and the characteristics of a MIM element (capacitance element).

(b) Manufacturing Method

A method of manufacturing the MEMS device according to the first embodiment will be explained hereinafter with reference to FIG. 2 and FIGS. 3A to 3D. FIGS. 3A to 3D show sectional structures in each process taken along line A-A' in FIG. 1. Hereinafter, an area where the MEMS variable capacitance element (movable structure) 10 in FIGS. 1 and 2 is provided is called a MEMS formation area, and an area where the actuators 30A and 30B are provided is called an actuator formation area. An area where the MIM capacitance element 50 is provided is called a MIM formation area.

Figure 3A:
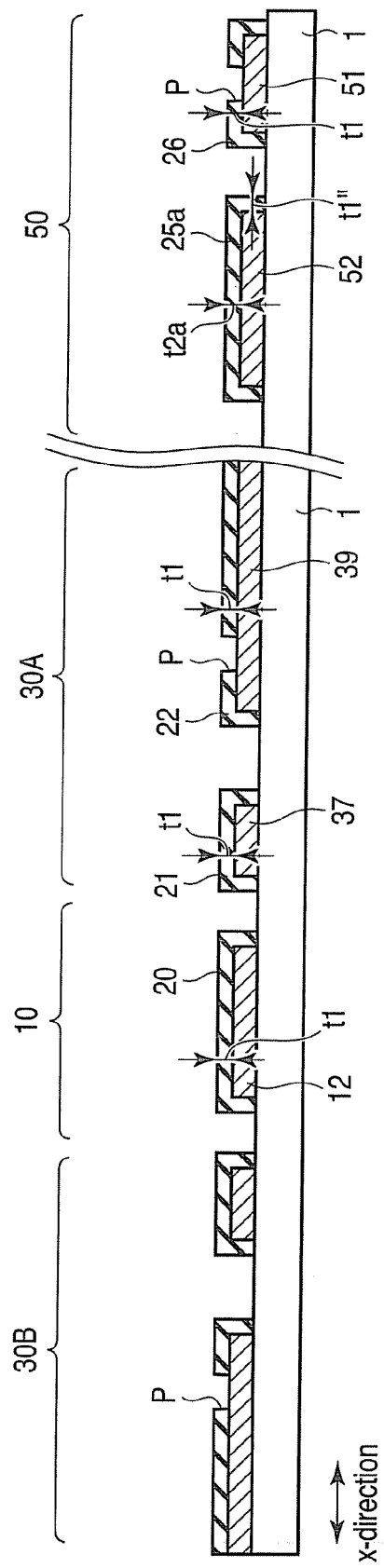

First, as shown in FIG. 3A, a conductive layer is deposited on the substrate 1 by a spattering method or a CVD method. A conductive layer is made of a metal such as aluminum (Al), copper (Cu) or gold (Au), an alloy of these metals, or a conductive semiconductor such as conductive polysilicon. A deposited conductive layer is processed by photolithography and reactive ion etching (RIE), and electrodes and interconnects are formed in predetermined shapes. In a MEMS formation area 10, a conductive layer 12 is used as a lower signal electrode of a MEMS variable capacitance element. In actuator formation areas 30A and 30B, a conductive layer 37 is used as a lower drive electrode 37 of an actuator. In a MIM formation area 50, a conductive layer 52 is used as a lower electrode of a MIM capacitance element. Conductive layers 39 and 51 are used as interconnects, for example.

After conductive layers are processed, insulators 20, 21, 22, 25a and 26 are formed on the surfaces of the processed conductive layers 12, 37, 39, 51 and 52 by a film deposition technique such as the thermal oxidation method or the CVD method. Insulators 20, 21, 22, 25a and 26 are made of any one of a silicon oxide film, silicon nitride film, insulative metal oxide film, or a high-dielectric-constant (high-k) film. When insulators are formed by a film deposition technique, insulators 20, 21, 22, 25a and 26 are formed on the substrate 1 as well as on the conductive layers. In this embodiment, an insulator formed on the substrate 1 is omitted from the drawings.

In the MEMS formation area 10, insulator 20 formed on conductive layer (lower signal electrode) 12 is an insulator used for a MEMS variable capacitance element. Insulator 20 has thickness t1, for example. In the actuator formation areas 30A and 30B, insulator 21 formed on conductive layer (lower drive electrode) 37 is an insulator used for an actuator. Insulator 21 is of the same material as that of insulator 20, and has the same thickness t1. Thickness t1 of insulator 20 reduces an electric field (noise) produced between the opposing electrodes of a MEMS variable capacitance element in a range of obtaining a desired capacitance when a MEMS variable capacitance element is driven.

In the MIM formation area 50, insulator 25a formed on conductive layer (lower electrode) 52 is an insulator used for a MIM capacitance element. Insulator 25a is of the same material as that of insulator 20, and is formed simultaneously with insulator 20. Thickness t2a of insulator 25a is substantially the same as thickness t1 of insulator 20.

Insulators 22 and 26 formed on conductive layers 39 and 51 used as interconnects consist of the same material as does insulator 20, and have the same thickness t1.

An opening P is formed in insulators 22 and 26, so that the upper surface of conductive layers 39 and 51 are exposed in an area (an anchor/contact formation area), where anchors to support the upper electrode of the MEMS variable capacitance element in midair and contacts are formed.

Next, as shown in FIG. 3B, a sacrificial layer 41 is formed on the substrate 1 by a CVD method or a coating method. The sacrificial layer 41 may be made of any one of a metal, insulating material, semiconductor, inorganic compound, and organic compound, as long as it ensures a selective etching ratio to the substrate 1, conductive layers 12, 37, 39, 51 and 52, insulators 20, 21, 22, 25a and 26, and members formed in a later process.

In the anchor/contact formation area, an opening Q1 is formed in the sacrificial layer 41. In the anchor/contact formation area, the insulators are previously removed from a surface of conductive layers (interconnects) 39 and 51, and the surfaces of conductive layers 39 and 51 are exposed through opening Q1. An anchor and a contact are embedded in opening Q1 in a later process.

In this embodiment, simultaneously when opening Q1 is formed, opening Q2 is formed in the sacrificial layer 41 on insulator 25 in the MIM formation area 50. This exposes the upper surface of insulator 25a used for a MIM capacitance element.

As described above, at the same time as forming opening Q1 for embedding an anchor, opening Q2 for exposing insulator 25 used for a MIM capacitance element is formed in the sacrificial layer 41.

Consequently, as shown in FIG. 3C, the upper surface of insulator 25 constituting a MIM capacitance element is processed by physical etching (spattering) or wet etching through opening Q2.

By the etching, the thickness of insulator 25 is reduced to t2, which is less than the thickness of insulator 20. In contrast, as the upper surface of insulator 20 constituting a MEMS variable capacitance element is covered by the sacrificial layer 41, the thickness of insulator 20 is not reduced by the etching. Therefore, thickness t1 of insulator 20 constituting a MEMS variable capacitance element is maintained.

As described above, by the etching through opening Q2, thickness t2 of insulator 25 constituting a MIM capacitance element is reduced to be less than thickness t1 of insulator 20 constituting a MEMS variable capacitance element. In this embodiment, insulator 21 constituting an actuator is covered by the sacrificial layer 41 like insulator 20 constituting a MEMS variable capacitance element, and the thickness of insulator 21 is not reduced by the etching, and is still of the same thickness as insulator 20.

During etching to reduce the thickness of insulator 25, the surfaces of the exposed conductive layers (interconnects) 39 and 51 are subjected to the same etching conditions through opening Q1 in the anchor/contact formation area. At this time, a naturally formed film such as a naturally oxidized film and a naturally nitrided film, or dust (residue) caused by a sacrificial layer is removed by the etching from the surfaces of conductive layers 39 and 51. As dust and impurities are removed from the surfaces of conductive layers 39 and 51, the contact resistance between an interconnect and an anchor/contact formed in a later process can be reduced, and a sufficient bonding force between a conductive layer and an anchor/contact can be ensured. This improves the reliability and characteristics of a MEMS device using a MEMS variable capacitance element and a MIM capacitance element.

As described above, the step of thinning insulator 25 constituting a MIM capacitance element is simultaneously executed with the step of cleaning the surfaces of conductive layers 39 and 51 used as interconnects in a common process.

Figure 3D:
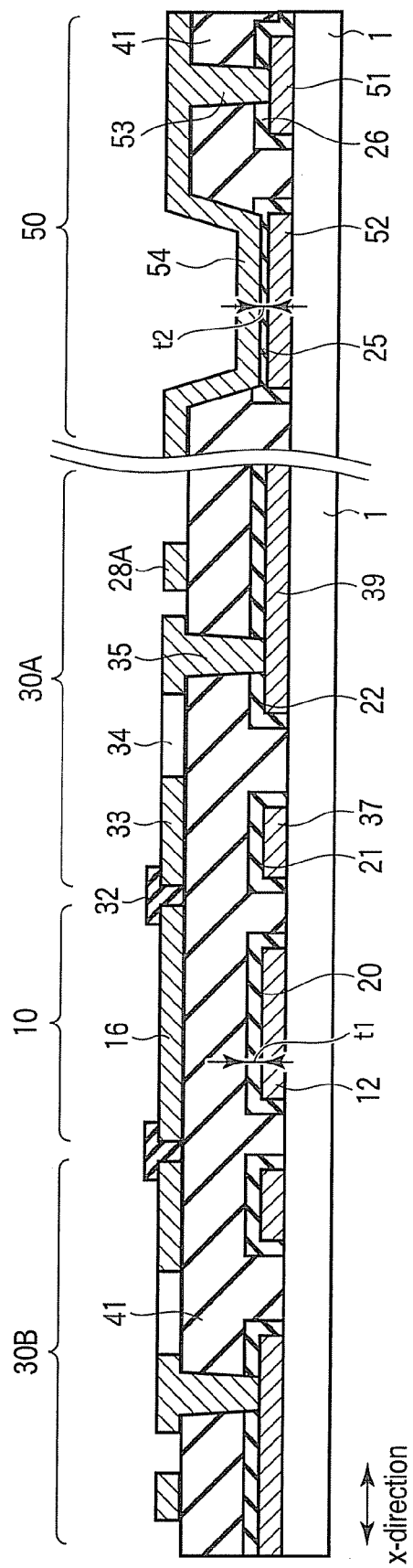

As shown in FIG. 3D, a conductive layer (e.g., Al, Cu, or Au) is deposited on the sacrificial layer 41 and insulator 25 by spattering or CVD method, for example.

The deposited layer is processed by photolithography and reactive ion etching (RIE), for example, and electrodes and interconnects of predetermined shapes are produced from the conductive layer. Thereby, the upper signal electrode 16 of the MEMS variable capacitance element 10 is formed above the lower signal electrode 12 of the MEMS variable capacitance element 10 through the sacrificial layer 41. The upper drive electrode 33 of the actuators 30A and 30B is formed above the lower drive electrode 37 of the actuators 30A and 30B through the sacrificial layer 41. The upper electrode 54 of a MIM capacitance element is formed on insulator 25 so as to directly contact insulator 25 constituting a MIM capacitance element.

For example, by using the deposited conductive layer, a beam for supporting an upper signal electrode and a meandering spring structure 34 are formed at the same time. Further, a conductive layer is embedded in opening Q1 in the sacrificial layer 41 at the time it is deposited on the sacrificial layer 41. Conductive layers 35 and 53 embedded in opening Q1 are used as an anchor and a contact. Members used for forming the spring structure 34 and anchor 35 may be made in a different process by using a material different from that of a conductive layer constituting the upper electrode. When a conductive layer is processed, an opening (not shown) for removing the sacrificial layer 41 is formed in the conductive layer.

Subsequently, an insulator is deposited on the upper signal electrode 16 and upper drive electrode 33, and is processed by photolithography and reactive ion etching (RIE). As a result, the joint 32 is formed on the upper signal electrode 16 and upper drive electrode 33. The joint 32 connects the upper signal electrode 16 of MEMS variable capacitance element and the upper drive electrode 33 of actuator.

Thereafter, as shown in FIG. 2, wet etching is executed to selectively remove a sacrificial layer. By the etching solution penetrated through an opening formed in a conductive layer, a sacrificial layer is removed from the MEMS formation area 10, the actuator formation areas 30A and 30B, and the MIM formation area 50.

As a sacrificial layer is removed, a cavity is provided between the upper signal electrode 16 and lower signal electrode 12 of the MEMS variable capacitance element 10. As the stress of the joint 32 is different from that of the spring structure 34 of the upper drive electrode 33 of actuator, the spring structure 34 is inclined downward.

In the above processes, the MEMS device according to the first embodiment of the invention is completed.

In the MEMS device according to the first embodiment of the invention, as shown in FIG. 3B, the sacrificial layer 41 is formed and removed from a surface of insulator 25a covering the lower electrode 52 of MIM capacitance element, and the upper surface of insulator 25a is exposed. In contrast, insulator 20 on the lower signal electrode 12 of MEMS variable capacitance element is covered by the sacrificial layer 41. And, as shown in FIG. 3C, the upper surface of the exposed insulator 25 is etched, and thickness t2 of insulator 25 constituting a MIM capacitance element is reduced to less than thickness t1 of the lower signal electrode 12 of MEMS variable capacitance element.

As described above, in the method of manufacturing a MEMS device according to this embodiment, thickness t2 of insulator 25 interposed between two electrodes of MIM capacitance element is reduced, and the interval between the opposing electrodes 52 and 54 is reduced. Therefore, in comparison with a case where insulator 25 is of the same thickness as insulator 20 used for a MEMS variable capacitance element, the capacitance of the MIM capacitance element 50 is increased.

In contrast, as insulator 20 of MEMS capacitance element is covered by the sacrificial layer 41, when the thickness of insulator 25 of MIM capacitance element is reduced, insulator 20 constituting a MEMS variable capacitance element is not thinned, and remains thick in a range of obtaining a desired capacitance. Therefore, when the MEMS variable capacitance element 10 is driven, an electric field produced between electrodes 12 and 16 of the MEMS variable capacitance element 10 is alleviated by the thick insulator 20.

In the process shown in FIG. 3B, opening Q2 is formed to expose the surface of insulator 25a. Opening Q2 is formed simultaneously with opening Q1 for embedding an anchor and a contact in the sacrificial layer 41. As the openings are formed in the same process, the process of exposing the surface of insulator 25 used for a MIM capacitance element is not added to a excessively and complicated step in the process of manufacturing a MEMS device, and the number of manufacturing processes is not increased.

At the time insulator 25 constituting a MIM capacitance element is thinned through opening Q2, a naturally oxidized film and dust are removed from the surfaces of interconnects 39 and 51 exposed through opening Q1. As the process of increasing the reliability of elements is executed simultaneously with the process of reducing the thickness of insulator 25, as described above, the number of manufacturing steps is not increased, and the deterioration of the reliability and characteristics of the elements 10 and 50 caused by defects in the interface between the anchor/contact and interconnects 39 and 51 is suppressed.

Therefore, according to the method of manufacturing a MEMS device according to the first embodiment of the invention, it is possible to provide a MEMS device comprising a MEMS element (MEMS variable capacitance element) and MIM element (MIM capacitance element) having improved reliability and characteristics.

(2) Second Embodiment

An explanation will be given of a MEMS device according to a second embodiment of the invention, and a method of manufacturing the MEMS device with reference to FIGS. 4 and 5. Components the same as those in the first embodiment will be denoted by the same reference numbers, and a detailed explanation thereof only given where needed.

(a) Structure

An explanation will be given of a structure of a MEMS device according to a second embodiment of the invention with reference to FIG. 4. The differences from the MEMS device of the first embodiment will be explained. FIG. 4 is a sectional view taken along line A-A' in FIG. 1.

Figure 4:
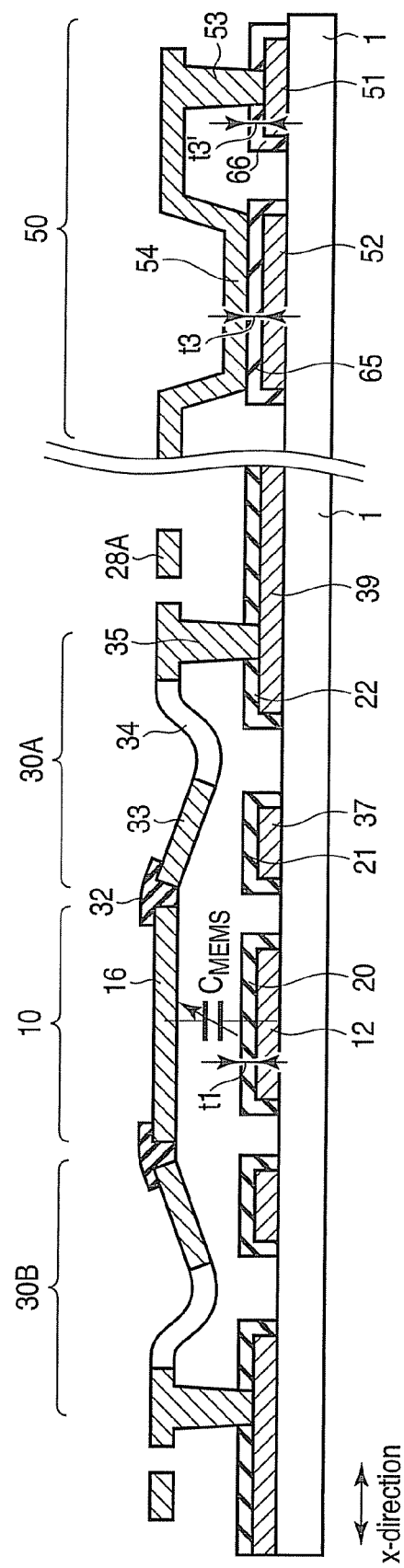
FIG. 4 is a sectional view showing a structure of a MEMS device according to a second embodiment.

As shown in FIG. 4, in a MEMS device according to this embodiment, an insulator 65 constituting a MIM capacitance element 50 is of a material different from that of insulator 20 constituting the MEMS variable capacitance element 10. A dielectric constant of insulator 65 (second dielectric constant) is higher than a dielectric constant of insulator 20 (first dielectric constant).

Thickness t3 of insulator 65 is less than thickness t1 of insulator 20. Thickness t3 of insulator 65 is preferably less than thickness t1 of insulator 20, but may be the same.

Insulator 65 is made of a high-dielectric-constant material such as hafnium oxide ($HfO_2$), aluminum oxide ($Al_2O_3$) or zirconium oxide ($ZrO_2$). However, if silicon oxide is used for insulator 20 of the MEMS variable capacitance element 10, insulator 65 of the MIM capacitance element 50 may be made of silicon nitride or silicon oxynitride.

As described above, the capacitance of a capacitance element is proportional to a dielectric constant of an insulator interposed between two electrodes. Therefore, as in the MEMS device of this embodiment, the capacitance of the MIM capacitance element 50 can be increased by making insulator 65 used for the MIM capacitance element 50 from a material having a higher dielectric constant than that of insulator 20 used for the MEMS variable capacitance element 10. Interconnect 51 is covered by an insulator 66. Insulator 66 is of the same material as that of insulator 65, and has thickness t3, the same thickness as that of insulator 65. Insulator 66 covering interconnect 51 may be of the same material as that of insulators 20, 21 and 22. In this case, insulator 66 has thickness t1, the same thickness as that of insulators 20, 21 and 22.

Insulator 20 constituting the MEMS variable capacitance element 10 is of a material different from that of insulator 65 constituting the MIM capacitance element 50, and thickness t1 of insulator 20 can be made greater than thickness t3 of insulator 65 to meet the required characteristics of the MEMS variable capacitance element 10. Therefore, as in the first embodiment, an electric field produced between electrodes 12 and 16 can be reduced in the MEMS capacitance element 10, and the reliability of the element 10 is thereby improved.

Therefore, according to the MEMS device according to the second embodiment of the invention, the reliability of a MEMS element (MEMS variable capacitance element) can be improved, and the characteristics of a MIM element (MIM capacitance element) can be improved as in the first embodiment.

(b) Manufacturing Method

A method of manufacturing a MEMS device according to the second embodiment of the invention will be explained hereinafter with reference to FIG. 5. For the same process as in the manufacturing method of the MEMS device described in the first embodiment, a detailed explanation will be omitted, and the differences from the first embodiment method will be described. FIG. 5 is a sectional view taken along line A-A' in FIG. 1.

First, as in the manufacturing process shown in FIG. 3A, a lower signal electrode 12 of a MEMS variable capacitance element, a lower drive electrode 37 of an actuator, a lower electrode 52 of a MIM capacitance element, and interconnects 39 and 51 are formed on a substrate 1.

Figure 5:
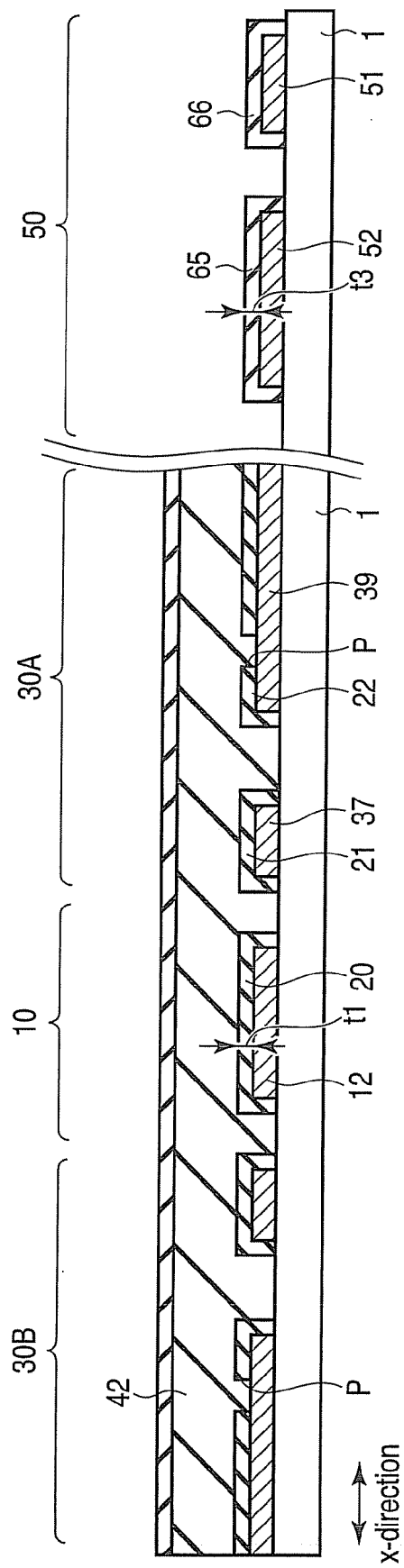
FIG. 5 is a view for explaining a method of manufacturing a MEMS device according to a second embodiment.

Next, as shown in FIG. 5, insulators 20, 21 and 22 are formed on electrodes 12, 37 and 52, and on interconnects 39 and 51. At the same time when an opening P is formed in insulator 22, the insulators on electrode 52 and interconnect 51 are removed from the MIM formation area 50 by photolithography and etching. In the MIM formation area 50, the insulator on interconnect 51 may not be removed.

A dummy layer 42 is deposited on the substrate 1. The dummy layer 42 is selectively removed from the MIM formation area 50 by photolithography and etching. The dummy layer 42 remains in the MEMS formation area 10 and actuator formation areas 30A and 30B.

As described above, in the MIM formation area 50, the surfaces of electrode 52 and interconnect 51 are exposed. In the MEMS formation area 10 and actuator formation areas 30A and 30B, insulators 20, 21 and 22 on conductive layers 12, 37 and 39 are covered by the dummy layer 42.

Subsequently, insulators 65 and 66 are deposited on the exposed electrode 52 and interconnect 51 by a film deposition technique such as the CVD method. At this time, an insulator is deposited on the dummy layer 42.

Insulator 65 is of a material having a higher dielectric constant than that of insulator 20, for example, hafnium oxide or aluminum oxide. Insulator 65 may be made of silicon dioxide, silicon nitride, or silicon oxynitride, as long as the dielectric constant of these materials is higher than that of the material of insulator 20. Thickness t3 of insulator 65 is made less than thickness t1 of insulator 20. If electrode 52 is made of aluminum, insulator 65 may be made of aluminum oxide by oxidizing the surface of electrode 52.

Thereafter, the dummy layer 42 and the insulators on the dummy layer are removed from the MEMS formation area 10 and actuator formation areas 30A and 30B.

For example, as in the process shown in FIG. 3B, the sacrificial layer is deposited in the MEMS formation area 10, actuator formation areas 30A and 30B, and MIM formation area 50. Openings Q1 and Q2 are formed in the deposited sacrificial layer 41. Opening Q1 is formed to expose the surface of interconnect 51 in the anchor/contact formation area. In this embodiment, openings Q1 and Q2 may not be formed in the same process.

A naturally oxidized film is removed from the surfaces of exposed interconnects 39 and 51 through opening Q1.

In the MIM formation area 50, the upper surface of insulator 65 on the lower electrode 52 is exposed through opening Q2. As in the process shown in FIG. 3C, insulator 65 may be thinned by etching through opening Q2.

Further, as in the process shown in FIG. 3D, the upper signal electrode of a MEMS variable capacitance element, the upper drive electrode of an actuator, and the upper electrode of a MIM variable capacitance element are formed simultaneously. Thereafter, a sacrificial layer is removed as shown in FIG. 4. By the above processes, a MEMS device according to this embodiment is completed.

By reversing the order of the process shown in FIG. 5, two insulators 20 and 65 may be made of different materials. In other words, after insulator 65 constituting a MIM capacitance element is formed on electrodes 12 and 52, insulator 65 is selectively removed from the MEMS formation area. Then, insulator 20 of a material different from that of insulator 65 may be formed on the electrode in the MEMS formation area 10. The MEMS device shown in FIG. 4 can be produced also in this case.

As described above, in the method of manufacturing a MEMS device according to the second embodiment, insulator 65 constituting the MIM capacitance element 50 is made of a material having a higher dielectric constant than that of insulator 20 constituting a MEMS variable capacitance element. Therefore, the MIM capacitance element 50 produced by the manufacturing method of this embodiment has a large capacitance. In contrast, insulator 20 constituting the MEMS variable capacitance element 10 is formed to ensure the thickness to reduce an electric field produced between the electrodes. Therefore, the manufacturing method of this embodiment can produce a MEMS variable capacitance element 10 having high reliability.

Therefore, as in the method of manufacturing a MEMS device according to the first embodiment, the method of manufacturing a MEMS device according to the second embodiment of the invention can provide a MEMS device, which improves the reliability of a MEMS element (MEMS variable capacitance element) and characteristics of a MIM element (MIM capacitance element).

(3) Third Embodiment

An explanation will be given of a MEMS device according to a third embodiment of the invention, and a method of manufacturing the MEMS device with reference to FIGS. 6 and 7. Components the same as those of the first and second embodiments will be denoted by the same reference numbers, and a detailed explanation thereof only given where needed.

(a) Structure

An explanation will be given of a structure of a MEMS device according to a third embodiment of the invention with reference to FIG. 6. The differences from the MEMS device according to the first embodiment will be explained. FIG. 6 is a sectional view taken along line A-A' in FIG. 1.

Figure 6:
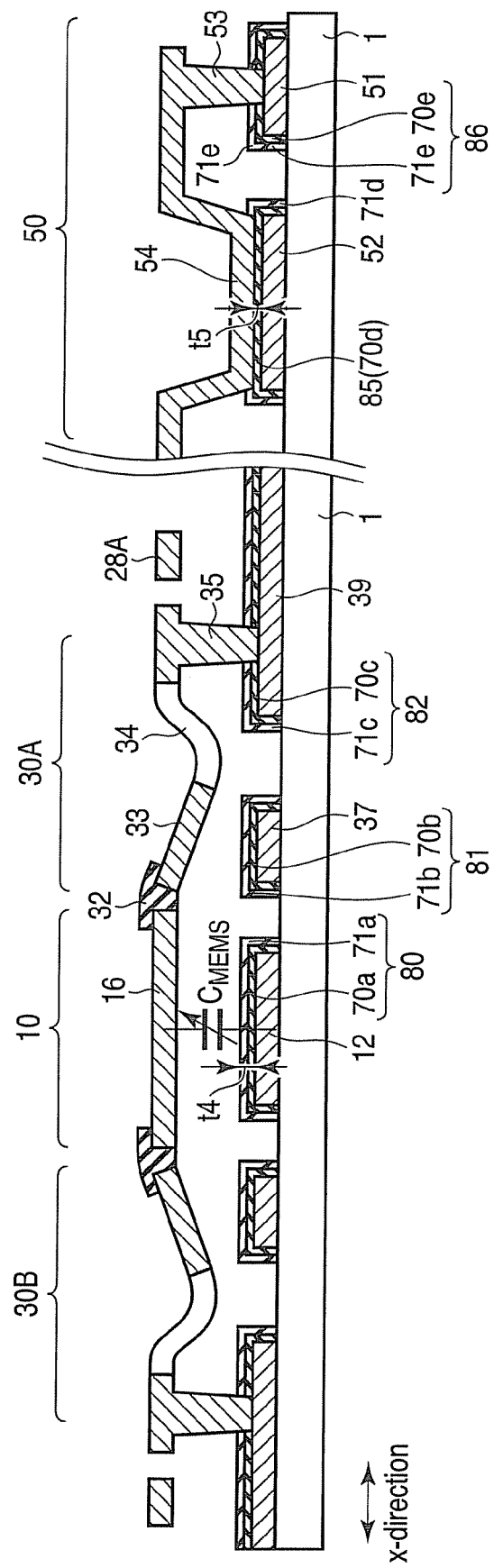
FIG. 6 is a sectional view showing a structure of a MEMS device according to a third embodiment.

As shown in FIG. 6, in a MEMS device according to this embodiment, an insulator 80 constituting a MEMS variable capacitance element 10 has a stacked structure comprising two insulating films 70a and 71a. The stacked insulator 80 has a thickness t4.

In an insulator 85 constituting a MIM capacitance element 50, one insulating film 70d is provided between a lower electrode 52 and an upper electrode 54.

An insulator 81 constituting actuators 30A and 30B has a stacked structure comprising two insulating films 70b and 71b, similar to the MEMS variable capacitance element 10.

Insulators 82 and 86 are provided on interconnects 39 and 51. Insulators 82 and 86 covering interconnects 39 and 51 have a stacked structure comprising insulating films 70c, 71c, 70*e* and 71*e*, similar to insulator 80 covering a lower signal electrode 12. The stacked insulators 82 and 86 have the same thickness t4 as that of insulator 80.

Insulating films 70*a* to 70*e* consist of a material having a high dielectric constant. Insulating films 71*a* to 71*e* consist of silicon oxide or silicon nitride, for example.

As shown in FIG. 6, in the MEMS variable capacitance element 10, insulator 80 has a stacked structure. As a result, thickness t4 of the stacked insulator 80 is increased. In contrast, in the MIM capacitance element 50, insulator 85 interposed between electrodes 52 and 54 has a single-layer structure, and its thickness t5 is less than thickness t4 of insulator 80.

Therefore, as in the first embodiment, insulator 80 in the MEMS variable capacitance element 10 reduces an electric field produced between electrodes 12 and 16 when the MEMS device is driven. Further, the capacitance of the MIM capacitance element 50 is increased.

In FIG. 6, insulator 80 comprises two insulating films 70*a* and 71*a*, and insulator 85 comprises one insulating film. The number of insulating films constituting insulator 80 is not limited to the number shown in FIG. 6, and the number is preferably more than the number of insulating films constituting insulator 85 interposed between electrodes 52 and 54. In other words, insulator 85 may have a stacked structure, if the number of layers of insulator 85 constituting a MIM capacitance element is less than the number of layers of the insulator constituting a MIM variable capacitance element.

As described above, according to the MEMS device of the third embodiment of the invention, the reliability of a MEMS element (MEMS variable capacitance element) can be improved, and the characteristics of a MIM element (MIM capacitance element) can be improved as in the first and second embodiments.

(b) Manufacturing Method

A method of manufacturing a MEMS device according to the third embodiment of the invention will be explained hereinafter with reference to FIG. 7. The differences from the method of manufacturing the MEMS device of the first and second embodiments will be described.

Figure 7:
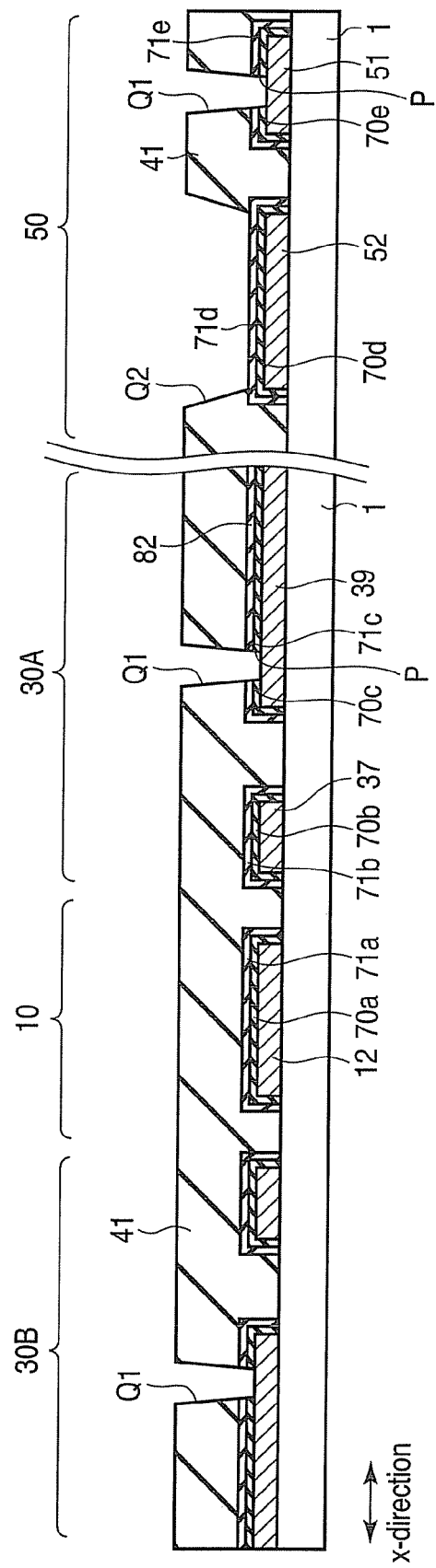
FIG. 7 is a view for explaining a method of manufacturing a MEMS device according to a third embodiment.

As shown in FIG. 7, as in the process shown in FIG. 3A, a lower signal electrode 12 of a MEMS variable capacitance element, a lower drive electrode 37 of an actuator, a lower electrode 52 of a MIM capacitance element, and interconnects 39 and 51 are formed on a substrate 1.

Next, an insulator is formed on the lower electrodes 12, 37 and 52, and on interconnects 39 and 51. In this embodiment, insulating films 70*a* to 70*e* and 71*a* to 71*e* are formed on electrodes 12, 37 and 52, and interconnects 39 and 51 by a film deposition technique, for example. Thereby, an insulator having a stacked structure is formed on electrodes 12, 37 and 52.

In FIG. 7, insulating films 70*a* to 70*e* and 71*a* to 71*e* are stacked on electrodes 12 and 52. Of course, three or more insulating films can be stacked on the electrodes.

After the insulators having a stacked structure are formed, an opening P is formed in insulators 70*c*, 71*c*, 70*e* and 71*e* on interconnects 39 and 51.

Subsequently, as in the process shown in FIG. 3B, a sacrificial layer 41 is formed on the substrate 1, lower electrodes 20, 37 and 52, and interconnects 39 and 51. An opening Q1 is formed in the sacrificial layer 41 in the anchor/contact formation area. At the same time when opening Q1 is formed, an opening Q2 is formed in the sacrificial layer 41. Thereby, as shown in FIG. 7, the upper surface of insulating film 71*d* of the lower electrode 52 is exposed in the MIM formation area 50. Further, as opening Q1 is formed, the upper surfaces of interconnect layers 39 and 51 are exposed in the anchor/contact formation area.

Thereafter, the exposed insulating film 71*d* is removed by physical etching or wet etching. Thereby, as shown in FIG. 6, the number of insulating films constituting insulator 85 of the MIM capacitance element 50 is reduced to less than the number of insulating films 70*a* and 71*a* constituting insulator 80 of the MEMS variable capacitance element 10.

After one or some of the insulating films constituting insulator 85 of the MIM capacitance element is removed, as in the process shown in FIG. 3D, an upper signal electrode of a MEMS variable capacitance element, an upper drive electrode of an actuator, and an upper electrode of a MIM variable capacitance element are formed simultaneously. Thereafter, a sacrificial layer is removed, and as shown in FIG. 6, the MEMS variable capacitance element 10, actuators 30A and 30B, and MIM capacitance element 50 are formed. As shown in FIG. 6, while insulator 80 of the MEMS variable capacitance element 10 comprises two insulating films 70*a* and 71*a*, insulator 85 of the MIM capacitance element 50 has a structure, in which one insulating film 70*d* is held between two electrodes 52 and 54.

By the above processes, a MEMS device according to this embodiment is completed.

In the example shown in FIG. 6, insulator 75*a* of the MIM capacitance element 50 comprises one insulating film, and insulator 80 of the MEMS variable capacitance element 10 comprises two insulating films 70*a* and 71*a*. The number of insulating films is not limited to them, if the number of insulating films constituting insulator 80 of the MEMS variable capacitance element 10 is higher than the number of insulating films constituting insulator 85 of the MIM capacitance element 50.

As described above, according to the method of manufacturing a MEMS device according to the third embodiment of the invention, the MEMS variable capacitance element 10 having insulator 80 having a stacked structure is formed. In contrast, insulator 85 constituting the MIM capacitance element 50 is formed by the less number of insulating films than the stacked insulator 80 of the MEMS variable capacitance element. In the example shown in FIG. 6, insulator 85 constituting the MIM capacitance element 50 has a single-layer structure, in which one insulating film 70*d* is held between the lower electrode 52 and upper electrode 54.

Therefore, thickness t5 of insulator 85 constituting the MIM capacitance element 50 is less than thickness t4 of the multilayer insulator 80 constituting the MEMS variable capacitance element 10. In comparison with the case where an insulator having the same structure as that of the insulator of the MEMS variable capacitance element 10 is used for the MIM capacitance element 50, the manufacturing method of this embodiment can produce a MIM capacitance element 50 having a large capacitance.

In contrast, in insulator 80 constituting the MEMS variable capacitance element 10, insulating films 70*a* and 71*b* are stacked, and the thickness is ensured to reduce an electric field produced between electrodes 12 and 16 of the MEMS variable capacitance element 10 when the MEMS device is driven. Therefore, the manufacturing method according to this embodiment can produce a MEMS variable capacitance element having high reliability.

Therefore, as in the method of manufacturing a MEMS device according to the first and second embodiments, the method of manufacturing a MEMS device according to the third embodiment of the invention can provide a MEMS device, which improves the reliability of a MEMS element (MEMS variable capacitance element) and characteristics of a MIM element (MIM capacitance element).

Application Examples

Application examples of the first to third embodiments will be described with reference to FIGS. 8A and 8B.

FIG. 8A shows an example, in which a MEMS device according to the embodiment of the invention is applied to a RF (high frequency) circuit. In the RF circuit shown in FIG. 8A, a MEMS variable capacitance element 10 is used as a RF oscillator, and a MIM capacitance element 50 is used as a blocking capacitor.

For example, a resistor element 90 and a power supply 92 are connected in parallel to the MEMS variable capacitance element 10. The resistor element 90 and power supply 92 are connected in series. The power supply 95 is a direct current power supply, for example, and applies a bias voltage to the MEMS variable capacitance element 10.

The MIM capacitance element 50 is connected in series between an output terminal 95 and one end of the MEMS variable capacitance element 10. In the RF circuit shown in FIG. 8A, the MIM capacitance element 50 functions as a blocking capacitor, and prevents a direct-current component from being supplied to the terminal 95.

As shown in FIG. 8A, the MEMS variable capacitor 10 is driven from a voltage of 10-20 V from the direct-current power supply 92. Thus, a blocking capacitor having sufficient capacitance is needed in a MEMS device as a RF circuit to prevent flowing out of a direct-current component from the direct-current power supply 92.

In the RF circuit using the MEMS device according to the embodiment of the invention, the thickness of an insulator used for the MIM capacitance element 50 is reduced to less than the thickness of an insulator used for the MEMS variable capacitance element 10, and the capacitance of the MIM capacitance element is increased. Therefore, the MIM capacitance element 50 of this embodiment realizes a blocking capacitor to block a direct-current component from the direct-current power supply 92.

Further, in the embodiment of the invention, the thickness of an insulator constituting the MEMS variable capacitance element 10 is greater than the thickness of an insulator constituting the MIM capacitance element 50. Thus, when a RF circuit is oscillated, an electric field distribution produced between two electrodes constituting the MEMS variable capacitance element 10 can be reduced. Therefore, the RF circuit using the MEMS device of the embodiment can decrease a noise caused by an electric field, and improves the reliability of the MEMS variable capacitance element 10. As the reliability of the MEMS variable capacitance element 10 is improved, the reliability of the RF circuit (MEMS device) using the MEMS variable capacitance element is of course improved.

Further, as described in the above embodiments, the MEMS variable capacitance element 10 is driven by the electrostatic actuators 30A and 30B.

As shown in FIG. 8B, the driving voltage Vout of the electrostatic actuators 30A and 30B is applied from a booster circuit 97. The booster circuit 97 boosts a supply voltage Vdd (e.g., 3 V), and produces the driving voltage Vout of the actuators 30A and 30B (e.g., 10-20 V).

The booster circuit 97 comprises MIM capacitance elements $50_1$-$50_n$. In the booster circuit 97, the MIM capacitance elements $50_1$-$50_n$ are connected in stages through a switch (not shown). The connection of the MIM capacitance elements $50_1$-$50_n$ is switched from parallel to series connection and vice versa by turning on/off a switch. The connection of the MIM capacitance elements $50_1$-$50_n$ is switched between charging and discharging of a capacitance element, and the supply voltage Vdd is boosted to the driving voltage Vout.

Two or more stages are required to boost the supply voltage to the predetermined driving voltage Vout, and the number of the MIM capacitance elements $50_1$-$50_n$ is increased. The boosting rate of the booster circuit 87 can be increased by increasing the capacitance $C_{MIM}$ of each of the MIM capacitance elements $50_1$-$50_n$.

When the opposing area of two electrodes of the MIM capacitance elements $50_1$-$50_n$ is increased to ensure the capacitance $C_{MIM}$ to obtain a predetermined boosting rate, the areas of the MIM capacitance elements $50_1$-$50_n$ are increased. In this case, in a circuit comprising the capacitance elements $50_1$-$50_n$ similar to the booster circuit 97, an occupied area in a chip of the circuit is increased. The size of a chip having a MEMS device depends on the scale of a semiconductor integrated circuit provided in a layer lower than the MEMS device, and is restricted by the quantity and size of the MEMS variable capacitance element 10, and the interconnect layout resulting from the scale of a circuit using the MIM capacitance elements $50_1$-$50_n$. Therefore, if the opposing area between the electrodes of the MIM capacitance elements $50_1$-$50_n$ is increased to ensure a boosting rate, the degree of freedom in designing a MEMS device may be lowered.

In contrast to the above, the capacitance $C_{MIM}$ of the MIM capacitance elements $50_1$-$50_n$ described in the embodiment of the invention is increased by reducing the thickness of the insulator interposed between two electrodes of the MIM capacitance element 50 to less than the thickness of the insulator constituting the MEMS variable capacitance element 10. Therefore, the occupied area of a circuit using the MIM capacitance elements $50_1$-$50_n$, for example, the booster circuit 97 can be reduced without increasing the area of the capacitance elements $50_1$-$50_n$.

As a result, the occupied area of the circuit using the MIM capacitance elements $50_1$-$50_n$ does not extremely restrict the design of a MEMS device, and the degree of freedom in designing a MEMS device is not lowered in the embodiment of the invention.

In a MEMS device according to the embodiment of the invention, the insulator configuration is different in the MEMS variable capacitance element 10 and MIM capacitance element, but they can be formed by using the common process. Therefore, the number of steps of manufacturing a MEMS device is not increased.

As described hereinbefore, according to the embodiment of the invention, in a MEMS device whose MEMS element and MIM element are formed in the common process, the reliability of a MEMS element (MEMS variable capacitance element) can be improved, and the characteristics of a MIM element (MIM capacitance element) can be improved. Further, the degree of freedom in designing a MEMS device according to the embodiment can be increased.

Application of the MIM capacitance element 50 described in the embodiment is not limited to a blocking capacitor and a booster circuit. It may be used as other elements included in a MEMS device.

[Others]

A bridge structure MEMS device provided with actuators on both sides of a MEMS variable capacitance element is taken as an example of a MEMS device according to the embodiment of the invention. The embodiment of the invention is not limited to such a MEMS device. The MEMS element and actuator may have a cantilever structure, as long as a MEMS device comprises a MEMS element (MEMS variable capacitance element) and a MIM element (capacitance element), and an insulator constituting a MIM element is thinner than an insulator constituting a MEMS element. This is much the same when the dielectric constant of an insulator of a MIM element is higher than that of an insulator of a MEMS element, and when insulators of MEMS element and MIM element have a stacked structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A MEMS device comprising:
    a MEMS element comprising a first lower electrode provided on a substrate; a first insulator which is provided on the upper surface of the first lower electrode, and has a first thickness; and a movable first upper electrode supported by an anchor in midair above the first lower electrode; and
    a fixed capacitance element comprising a second lower electrode provided on the substrate; a second insulator which is provided on the upper surface of the second lower electrode, and has a second thickness; and a second upper electrode provided on the second insulator, the fixed capacitance element having a certain capacitance between the second lower electrode and the second upper electrode,
    wherein the second thickness is less than the first thickness.

2. The device of claim 1, wherein the MEMS element comprises a third insulator which is provided on the side surface of the first lower electrode, and has a third thickness, and
    the capacitance element comprises a fourth insulating film which is provided on the side surface of the second lower electrode, and has a fourth thickness.

3. The device of claim 2, wherein the fourth thickness is the same as the third thickness.

4. The device of claim 2, wherein the fourth thickness is greater than the second thickness.

5. The device of claim 1, further comprising:
    an interconnect which is provided on the substrate, covered by a fifth insulator having an opening, and connected to a contact through the opening,
    wherein the thickness of the fifth insulator is the same as the first thickness.

6. The device of claim 1, further comprising:
    an actuator comprising a third lower electrode provided on the substrate, a sixth insulator provided on the upper surface of the third lower electrode, and a movable third upper electrode support in midair above the third lower electrode,
    wherein the thickness of the sixth insulator is the same as the first thickness.

7. The device of claim 1, wherein the second upper electrode contacts the upper surface of the second insulator.

8. The device of claim 1, wherein the MEMS element has a variable capacitance between the first lower electrode and first upper electrode.

9. A method of manufacturing a MEMS device comprising:
    forming a first lower electrode of a MEMS element, and a second lower electrode of a capacitance element on a substrate;
    forming a first insulator having a first thickness on the first and second lower electrodes; forming a sacrificial layer on the first insulator;
    forming a first opening in a sacrificial layer in an area forming an anchor, and forming a second opening in the sacrificial layer simultaneously with forming the first opening so that the first insulator on the second lower electrode is exposed;
    forming a second insulator having a second thickness less than the first thickness on the second lower electrode, by etching the exposed first insulator through the second opening;
    forming a conductive layer on the sacrificial layer and on the second insulator; and
    removing the sacrificial layer, after processing the conductive layer, and forming a first upper electrode of the movable MEMS element supported by an anchor in midair above the first lower electrode, and a second upper electrode of the capacitance element on the second insulating film.

10. The method of claim 9, further comprising:
    forming the first insulator on an interconnect on the substrate, simultaneously with forming the first insulator on the first and second lower electrodes;
    removing the first insulator formed on the interconnect, before forming the sacrificial layer;
    forming a third opening for exposing the surface of the interconnect in the sacrificial layer, simultaneously with forming the first and second openings; and
    removing impurities from the surface of the exposed interconnect through the third opening in the same process as that for forming the second insulator.

11. The method of claim 10, further comprising:
    forming a contact on the surface of the exposed interconnect, after removing impurities from the surface of the interconnect.

12. The method of claim 9, further comprising; embedding an anchor in the first opening simultaneously with forming the conductive layer on the sacrificial layer.

* * * * *